July 18, 1933.  H. A. JONES  1,918,337

BREATHER VALVE FOR TANKS

Filed Jan. 4, 1930

INVENTOR
Henry A. Jones
BY Lyon & Lyon
ATTORNEYS

Patented July 18, 1933

1,918,337

UNITED STATES PATENT OFFICE

HENRY ALBERT JONES, OF LYNWOOD, CALIFORNIA, ASSIGNOR TO FRANK V. LONG, OF COMPTON, CALIFORNIA, TRUSTEE

BREATHER VALVE FOR TANKS

Application filed January 4, 1930. Serial No. 418,551.

This invention relates to valves of the general type known as breather valves, and which are used in connection with tanks or other containers for gas or a liquid such as gasoline that is more or less volatile. In tanks used for this purpose it is necessary to control the internal pressure in order to prevent any possibility of the failure of the tank wall or roof by reason of unbalancing of the external and internal pressures. In other words, the function of these valves is to maintain an internal pressure within the tank or container which is near enough to atmospheric pressure on the outside of the tank to prevent any possibility of failure of the tank wall, or roof, whether from too great internal pressure or too great atmospheric pressure on its exterior. These valves are of relatively large area, and each valve usually includes a double valve, that is to say, an inlet valve and an outlet valve.

The general object of this invention is to provide a valve of this kind of simple construction and particularly adapted for having its parts constructed of sheet metal so that the complete device, although it may be of large size, will be of relatively light weight so that it can be readily raised and set in place over a tank.

It is necessary that the two relief valves employed in this breather valve should be reliable in operation so that they can be depended upon to open upon the existence of a certain differential pressure between the interior of the tank and the atmosphere outside of the tank.

One of the objects of the invention is to construct a valve so that the two relief valves can be depended upon to rise from their seats as soon as a certain definite differential pressure exists which might be dangerous to the tank wall or roof.

A further object of the invention is to provide simple means for guiding the valves when they rise from their seats.

Further objects of the invention will appear hereinafter.

The invention consists of the novel parts and combination of parts to be described hereinafter, all of which contribute to produce an efficient breather valve for tanks.

A preferred embodiment of the invention is described in the following specification, while the broad scope of the invention is pointed out in the appended claims.

Figure 1:
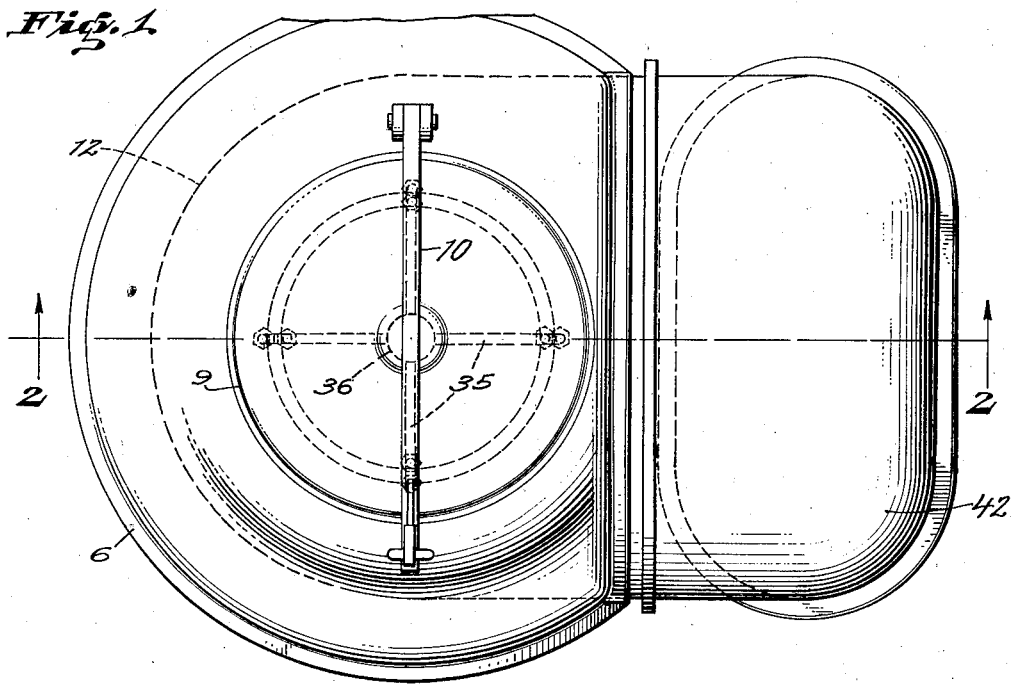
Fig. 1 is a plan of a valve embodying my invention.

Referring more particularly to the parts, 1 represents an outer casing which is preferably constructed of sheet metal in the form of a substantially spherical head, the lower portion of which is attached to a base plate 2. This outer casing or head 1 is preferably formed with a substantially flat side wall 3 having an opening 4 therethrough, preferably formed with an outwardly projecting flange 5 for a purpose which will appear hereinafter.

Figure 2:
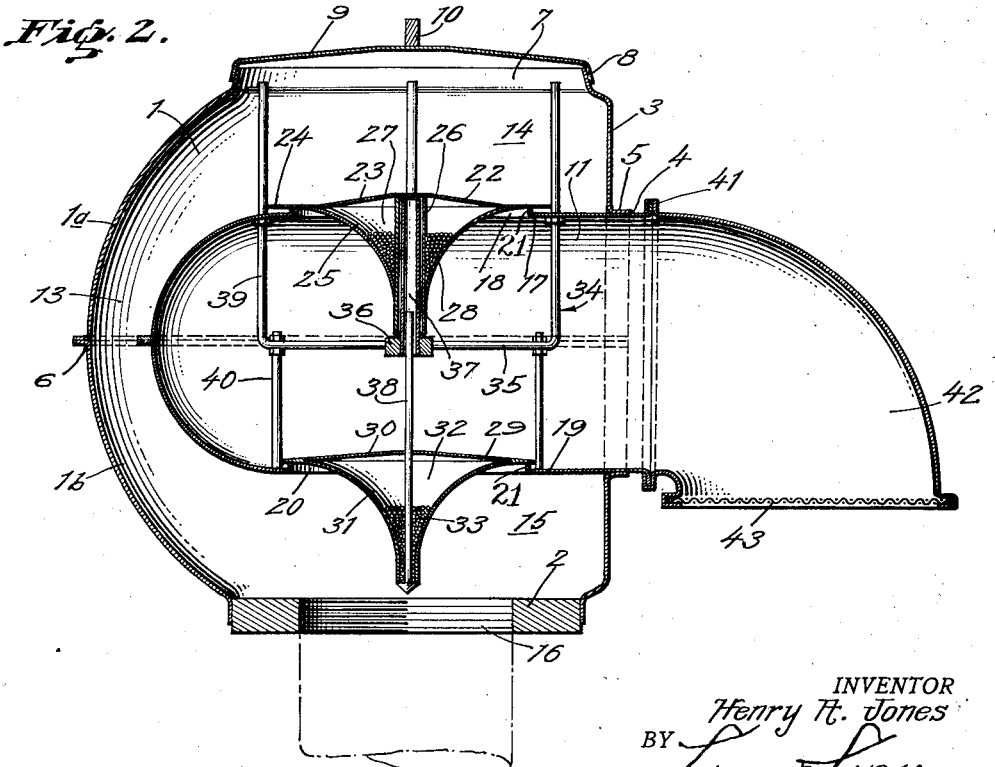
Fig. 2 is a vertical section through the valve, taken on the line 2—2 of Figure 1.

This outer casing is preferably formed in two sections, namely, an upper section $1^a$ and a lower section $1^b$ which sections meet together at a flanged joint 6 (see Fig. 2). The upper section $1^a$ has an upper opening 7 with a substantially conical seat 8 for a bonnet 9 which may be held down by a locked bar 10. The opening or mouth 4 on the side of the outer casing is preferably of substantially elliptical form and elongated in a horizontal direction, as will appear from a comparison of Figs. 1 and 2.

The breather valve includes an inner casing 11 that extends in through the opening 4 and which fills the opening so that the wall of the inner casing seats against the inner side of the flange 5 and so that a gas-tight connection is made at this point.

The inner end of the inner casing is of curved form, as indicated by the dotted line 12 in Fig. 1, so that it conforms to the shape of the outer casing and so that an annular space 13 is formed between the inner and outer casing and extending part-way around the same, this space communicating above with a valve chamber 14 in the upper part of the outer casing, and a valve chamber 15 in the lower part of the outer casing and directly over the base plate 2, where an opening 16 is provided to make a connection to the tank or other container with which the valve is employed.

The inner casing presents an upper wall 17 formed with a valve opening 18, and presents a lower wall 19 with a valve opening 20. These valve openings are preferably of circular form and concentric with each other, and at each valve opening the material of the wall is preferably turned upwardly to form a flange 21, the upper edge of which operates as a seat for the corresponding relief valve.

On the upper opening 18 an inlet relief valve 22 is provided, which like the outer casing and the inner casing, may be constructed out of sheet metal. This valve comprises a cover plate 23 of dished form having an annular outer portion 24 that is connected to a substantially conical shell 25 that cooperates with the plate 23 to form a hollow valve.

The shell 25, while it is of substantially conical form is preferably formed of concavo-convex shape, that is to say, the elements of the "cone" have a form as though they were formed on an arc struck on a radius. The middle portion of this valve is in the form of a tubular sleeve 26 that rigidly connects the lower end of the conical portion 25 of the valve with the plate 23. In this way, a hollow valve is formed with an internal chamber 27. I utilize this chamber to receive a quantity of a finely divided substance having a considerable specific gravity, for example, shot 28.

At the opening 20, lower valve 29 seats, which is very similar in its construction to the valve already described, but this valve operates as an outlet relief valve for relieving an excessive pressure on the interior of the tank with which the valve is used. In other words, this valve 29 is constructed of a dished cover plate 30 and a substantially concavo-convex conical portion 31, forming an internal chamber 32 which is likewise adapted to receive a quantity of shot 33. By regulating the amount of shot placed in these valves, the weight of the valve can be very nicely regulated, and furthermore, it will be noted that the use of shot in this way causes the center of gravity of the valve carrying the shot to be located considerably below the valve seat.

This is advantageous because the action of gravity operates like a central force pulling down on the middle of the valve, and this tends to prevent any tendency of the valves to become cocked or tilted with one edge raised and the opposite edge depressed.

The form of the underside of each valve is concavo-convex. In other words, the valve is of substantially conical form but with its face curved substantially as indicated. In this way the gas flowing upwardly gradually changes its direction of flow with as little friction as possible and without forming eddy currents.

The two relief valves are preferably provided with common guiding means. For this purpose, I provide a guide frame 34, the lower portion of which is in the form of a spider with a plurality of radial arms 35 extending outwardly from a central hub 36. This hub has attached to its center a tubular guide 37 that extends upwardly and inside of the sleeve 26 so as to guide the upper valve as it rises and falls. In addition to this, the lower valve is provided with an upwardly extending stem 38 that projects into the lower end of the guide tube 37.

One of the advantages of the guide construction described above is that the stem 38 and the guide tube 37 are in the atmosphere and are not exposed to the gases within the tank except when the valve opens. This reduces to a minimum the corrosive effects of the gases which may be very destructive on metal exposed to the gases.

It is obvious that instead of employing shot or similar finely divided substance in the chambers within the valves, any other desired means may be employed to give them the desired weight. For example, a small quantity of lead may be poured into them.

The guide frame 34 includes upwardly extending posts 39 that project vertically and which are formed as extensions of the arms 35. The upper ends of these posts project through the upper wall 17 of the inner casing and extend up parallel with each other near the periphery of the upper valve.

Near the outer ends of the arms 35 of the spider downwardly extending posts 40 are provided, which lie near the edge of the lower valve. These posts cooperate with the valves when they rise from their seats and assist the central guiding means in guiding the valves back onto their seats when the valves close.

The outer end of the inner casing extends outwardly beyond the flange 5 and forms a joint 41 with an elbow 42 that bends downwardly and has its mouth covered by a wire screen 43.

It is understood that the embodiment of the invention described herein is only one of the many embodiments this invention may take, and I do not wish to be limited in the practice of invention, nor in the claims, to the particular embodiment set forth.

I claim:

1. A breather valve having an outer casing of substantially circular form in plan, with an opening formed at one side thereof, an inner casing formed as a separate part extending in through the said opening, and making a gas-tight connection with the edge of said opening, and having an upper wall with a valve opening of circular form and a lower wall with a valve opening of circular form, said valve openings being in substantially axial alinement with each other, valves having solid discs corresponding to the said valve openings, filling the entire area of the said openings, common guiding means for guiding both valves adjacent the central axis, and weights carried by the valve discs below the valve openings cooperating with the guiding means to hold the valves upright when they open.

2. In a breather valve, the combination of an outer casing having an opening on one side, an inner casing filling the said opening, secured therein and extending into the interior of the outer casing, said inner casing having an upper wall with a valve opening and a lower wall with a valve opening, substantially in alinement with the first named valve opening, an inlet relief valve seating on the upper side of the upper opening, and an outlet relief valve seating on the upper side of the lower opening, a guide stem carried by the lower valve extending up coaxially from the lower valve, a fixed guiding means for guiding the upper end of the said stem, said upper valve having a guide tube closed above cooperating with the fixed guiding means for guiding itself on the fixed guiding means, and a weight surrounding the guide tube and located below the upper valve opening.

3. In a breather valve, the combination of an outer casing having an opening in its side, an inner casing mounted in the said opening and extending into the interior of the outer casing, said inner casing having an upper wall with a valve opening, and a lower wall with a valve opening in alinement with the first named opening, a valve corresponding to each valve opening, seating on the upper edge of each opening with the valve's body below the opening, said valves being in the form of substantially conical hollow shells below the valve openings with their points disposed downwardly so that chambers are formed within the valves, and weight material held in said chambers at the lower ends of the said conical shells to give each valve any desired weight to correspond with pressures under which the said valves operate, said weight material cooperating to maintain the valves upright when raised off their seats.

4. A breather valve to be connected to a tank or the like containing gas, having an outer casing with an opening in the side thereof, an inner casing mounted in said opening so as to fill the same, extending into the interior of the said outer casing, said inner casing having an upper wall with a valve opening and a lower wall with a valve opening substantially in alinement with the upper valve opening, a valve corresponding to each valve opening, said valves being in the form of substantially conical hollow shells with their reduced ends disposed downwardly, and having chambers therein to receive shot or the like to give the valves any desired weight, each of said valves seating upon the upper side of its corresponding valve opening, the low valve having an upwardly extending stem and the upper valve having a tubular central sleeve, and a fixed tubular guide received in the said sleeve and receiving the said stem so as to guide both of said valves.

5. A breather valve to be connected to a tank or the like containing gas, having an outer casing with an opening in the side thereof, an inner casing mounted in said opening so as to fill the same, extending into the interior of the said outer casing, said inner casing having an upper wall with a valve opening and a lower wall with a valve opening substantially in alinement with the upper valve opening, a valve corresponding to each valve opening, said valves being in the form of substantially conical hollow shells with their reduced ends disposed downwardly, and having chambers therein to receive shot or the like to give the valves any desired weight, each of said valves seating upon the upper side of its corresponding valve opening, the lower valve having an upwardly extending stem, and the upper valve having a tubular central sleeve, a fixed tubular guide received in the said sleeve and receiving the said stem so as to guide both of said valves, and guide means in the form of upwardly extending posts disposed around the periphery of the valves and cooperating with the said tubular guiding means to guide the valves when they rise off of their openings.

6. A breather valve for controlling the internal pressure in a tank or the like containing gas, having an outer casing with an opening in its side wall, an inner casing located at the said opening and projecting into the interior of the outer casing, said inner casing having an upper wall with a valve opening therein, and a lower wall with a valve opening therein substantially in alinement with the upper valve opening, a guide frame supported on the inner casing, comprising a spider with arms having extensions secured to the inner casing, a central guide tube supported on the spider and extending upwardly therefrom, an upper valve seated on the upper edge of the upper opening and guided on the exterior of the said tubular guide, a lower valve seating on the upper edge of the lower opening and having a stem fitting in the bore of the tubular guide and extending up through the interior of the same, posts attached in the upper and lower wall of the inner casing extending substantially vertically adjacent the peripheries of the valves to cooperate with the central guide tube to guide the said valves and prevent cocking of the valves when they rise off of their seats, and a removable cover for the outer casing enabling the posts to be attached after the inner casing has been inserted in the outer casing.

7. A valve of the kind described, having a cover plate with an annular outer portion to come upon the valve seat, and having a centrally disposed substantially conical body extending down from the cover plate and having a chamber therein below the cover plate, and a weighting material received in said chamber located considerably below the level of the valve seat and operating to maintain the valve in a substantially upright position when it is off its seat.

8. A breather valve formed of sheet metal having an outer casing with an opening in one side wall thereof, an inner casing separate from the outer casing, extending in through the said opening into the interior of the outer casing and having an upper wall with a valve seat on its upper side and a relief inlet valve received on the seat, and a lower wall with a valve seat on its upper side with an outlet relief valve received on the last named seat, said valves being of substantially conical form and each having a head resting on its seat with the body of the valve extending down through the valve opening and having a chamber at its lower end to hold a weight at a considerable distance below the valve seat with a chamber in their lower end.

9. A valve of the kind described having a body of substantially conical form, but having elements concave on their outer side and convex on their inner side, means for supporting the valve and guiding the same with its smaller end downward, and a weight substance carried in the valve near its lower end.

10. A valve of the kind described having a body of substantially conical form composed of elements concave on their outer side and convex on their inner side and forming a chamber within the same, said valve constructed to operate with its small end downwardly, and a weight substance carried within the valve at its lower end.

11. A valve of the kind described having a shell of substantially conical form composed of elements concave on their outer side and convex on their inner side with the small end of the valve disposed downwardly, a guide stem passing up from the lower end of the valve within said conical shell, said valve having a cover plate connected with the large end of the shell and having a weight substance carried in the lower end of the shell around the guide stem.

12. A breather valve to be connected to a tank or the like containing gas, having an outer casing with an opening in the side thereof, an inner casing mounted in said opening so as to fill the same, extending into the interior of the said outer casing, said inner casing having an upper wall with a valve opening and a lower wall with a valve opening substantially in alinement with the upper valve opening, a valve corresponding to each valve opening, said valves being in the form of substantially conical hollow shells with their reduced ends disposed downwardly, and having chambers therein to receive shot or the like to give the valves any desired weight, each of said valves seating upon the upper side of its corresponding valve opening, the lower valve having an upwardly extending stem and the upper valve having a tubular central sleeve receiving the said stem.

13. A breather valve to be connected to a tank or the like containing gas, having an outer casing with an opening in the side thereof, an inner casing mounted in said opening so as to fill the same, extending into the interior of the said outer casing, said inner casing having an upper wall with a valve opening and a lower wall with a valve opening substantially in alinement with the upper valve opening, a valve corresponding to each valve opening, said valves being in the form of substantially conical hollow shells with their reduced ends disposed downwardly, and having chambers therein to receive shot or the like to give the valves any desired weight, each of said valves seating upon the upper side of its corresponding valve opening, the lower valve having an upwardly extending stem, and the upper valve having a tubular central sleeve, receiving said stem, and means for guiding each of the valves at their edges.

HENRY ALBERT JONES.